(Model.)
J. T. PEDERSEN.
BIT STOCK.
No. 317,187. Patented May 5, 1885.
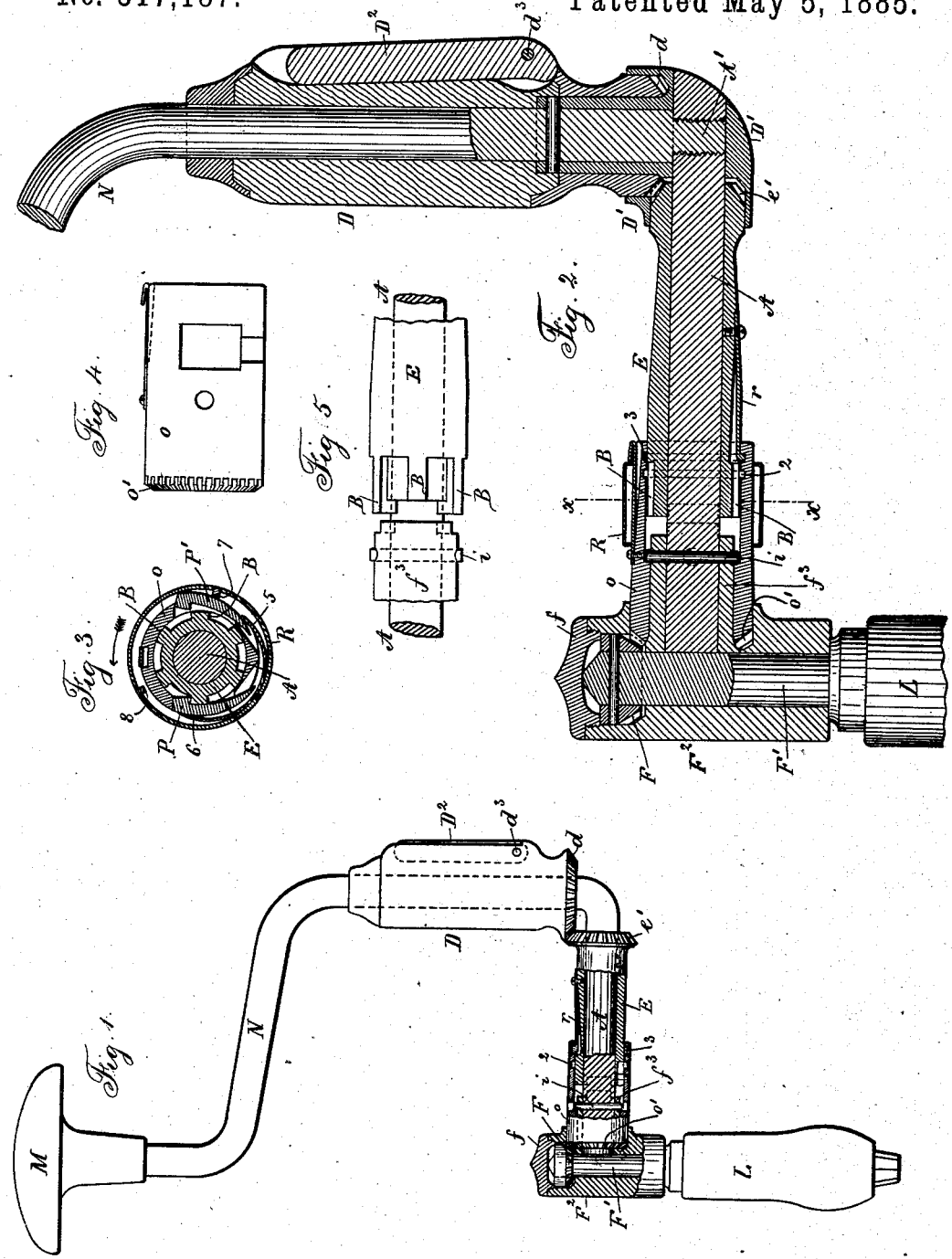
Witnesses:
J. Staib
Chr. H. Smith
Inventor:
Johannes T. Pedersen
per Lemuel W. Serrell
Atty

UNITED STATES PATENT OFFICE.

JOHANNES TH. PEDERSEN, OF BROOKLYN, NEW YORK.

BIT-STOCK.

SPECIFICATION forming part of Letters Patent No. 317,187, dated May 5, 1885.

Application filed March 5, 1885. (Model.)

*To all whom it may concern:*

Be it known that I, JOHANNES TH. PEDERSEN, of Brooklyn, in the county of Kings and State of New York, have invented an Improvement in Bit-Stocks, of which the following is a specification.

Bit-stocks have been made with gearing between the tool-holder and the handle of the brace, so that when the brace is revolved and the handle is firmly held a multiplied motion is given to the tool-holder to revolve the same with greater rapidity; but the gearing was exposed and liable to become injured or obstructed or to catch in the clothing of the workman.

My improvement is made for simplifying the construction, for inclosing all the moving parts, and for allowing the bit-stock to be reciprocated and used as a ratchet-drill working in either direction. I connect the handle by gears to a tubular shaft surrounding one crank-arm of the brace, and at the other end of the tubular shaft is the gear-wheel to the gear of the tool-holder; or I divide the tubular shaft into two parts, so as to apply a coupling or a coupling and double ratchet devices for rotating the tool when the brace is swinging back and forth the same as a ratchet-drill.

In the drawings, Figure 1 is an elevation partially in section to illustrate the general features of my invention. Fig. 2 is a section, in larger size, of the handle and connecting-gearing between the same and the tool-holder. Fig. 3 is a cross-section at the line $x\ x$. Fig. 4 is an elevation of the tubular arbor, and Fig. 5 is an elevation showing the coupling for the ends of the tubular shaft and the tubular projections of the head.

The bit-stock is composed of an ordinary tool-holder or chuck, L, a head or presser, M, the crank-arm N, the handle D, and the arm A. These parts are of any ordinary construction, except that the crank-arm N and arm A are not made as usual; but they are preferably united together at A' by the end of the crank N being screwed into the arm A, and there being a shield, D', at the intersection.

The handle D is provided with a bevel-gear, $d$, at the lower end, which passes into a recess in the shield D', and this handle is either plain or provided with a projection or with a lever-arm, $D^2$, pivoted at $d^3$, and closing into a recess in the handle D, when not required, and adapted to be swung out to form a holdfast to prevent the handle revolving in the hand of the workman as he grasps such handle and rotates the brace.

The tool-holder L is provided with a shaft, F', passing through the head $F^2$, and terminating with a gear, F, within a recess at the upper end, and there is a cap, $f$, that is screwed to the head $F^2$, and against the inner face of which the end of the shaft F' bears as the tool is pressed to its place in boring.

At one side of the head $F^2$ is a tubular projection, $f^3$, into which the end of the arm A is received and securely fastened, preferably by a pin, $i$, passed through the parts, with its ends projecting slightly. Around this tubular projection $f^3$ is a tubular arbor, $o$, with a bevel gear-wheel, $o'$, at the inner end gearing into the teeth of the wheel F. The tubular arbor $o$ preferably extends over and beyond the ends of the pin $i$, there being holes through the tubular arbor for the insertion or removal of the said pin $i$; but the inside of the tubular arbor is recessed for the ends of such pin $i$, so that the pin will keep the tubular arbor in place endwise, but the arbor is free to be rotated. The tubular shaft E surrounds the straight rigid arm A, and at one end there is a bevel-gear, $e'$, gearing into the bevel-gear $d$ of the handle D. It will now be understood that if the tubular shaft E and tubular arbor $o$ are connected or formed as one, the tool-holder will be revolved in the same direction as the bit-brace, but with an accelerated velocity, because the gear $d$ is larger than $e'$ and the gear $o'$ larger than F. These gears can be proportioned to give any desired speed. The gear $e'$ is in a recess in the cap D'; hence all the gears are covered, and the arm A forms the bearing for the tubular shaft E. The end of the tubular shaft E passes into the end of the tubular arbor $o$, and there are annular grooves 2 and 3 around inside this arbor $o$ near the end, and a spring-latch, $r$, or similar connection upon the shaft E, with the end catching into one of these grooves. Where the parts are in the normal position for use, the end of the latch $r$ is in the groove 3. If this latch is depressed, the tubular shaft E may be slipped endwise to disconnect the gear $e'$ from the gear $d'$, and then the end of the latch $r$ will be received into the groove 2. In giving this endwise movement the end of the shaft E is locked by the end of such shaft being made with notches and projections passing into corresponding notches in the end of the tubular bearing $f^3$, thereby holding the arbor $o$, gear F, shaft F', and tool-holder so that they rotate with the other part of the brace. I apply at the same place the ratchet-connection that allows the brace to be used as a ratchet-drill by reciprocating or swinging the same, and thereby revolving the tool in either direction.

Around the outside of the shaft E there are recesses cut longitudinally and forming between them parallel ribs B, and the tubular arbor $o$ is mortised for the reception of the pawls P P', which stand in opposite directions, and each pawl has a segmental tapering tail over the inclined bottom of the recess that receives said tails, and around the pawls is a hollow ring, R, that has within it the two springs 5 6 and the two blocks 7 8.

In the position shown in Fig. 3 the spring 6 causes the pawl P to spring inwardly and catch against one of the ribs B upon the shaft E, and the beveled end of such pawl is pressed back by each successive projection when the shaft E is being revolved in the direction of the arrow; hence the shaft E will turn the tubular arbor $o$ when the former is being revolved in the opposite direction to the arrow, Fig. 3. During this time the pawl P' has been out of action, the spring 5, pressing upon the tail thereof, has thrown the head up out of the way of the ribs B. The block 7 prevents the pawl P' becoming misplaced. When the ring R is turned partly around, the spring 6 is brought to press upon the tail of the pawl P, lifting the head out of action, and at the same time the spring 5 presses upon the head of P', throwing the same into action, and as this works in the reverse direction to the pawl P the arbor $o$ will be rotated in the opposite direction to the arrow, Fig. 3, when the bit-stock is swung back and forth.

All the parts of this bit-stock are easily made and kept in order, and there is but little risk of chips and foreign substances obstructing any of the parts, because they are inclosed.

I remark that it is not necessary to make the arm A separate from the crank N, as the handle D and gear $d$ may be made in two parts and screwed together after being put in place, and the cap can either be slipped on or made in two halves. The tubular shaft E can be slipped upon the arm A when the end of the latter is out of the tubular projection $f^3$.

I claim as my invention—

1. The combination, in a bit-stock, of the presser M, crank-arm N, straight arm A, the handle D, stock $F^2$, tubular shaft E between the handle and the stock, shaft F' of the tool-holder, the gear $d$ on the handle D, the wheels $e'$ and $o'$ on the shaft E, and the gear-wheel F, within and protected by the stock $F^2$, substantially as set forth.

2. The combination, in a bit-stock, of the crank N and arm A, the cap D', recessed at its ends for the gears $d$ and $e'$, and surrounding the intersection of the crank and shaft, the handle D around the crank N, gear $d$ at the end of the handle D, and the tubular shaft E and gear $e'$ around the arm A, substantially as set forth.

3. The combination, in a bit-stock, of the head $F^2$, having a tubular projection, $f^3$, at one side, the bit-holder L, and shaft F', the gear F at the end of the shaft F', and the screw-cap $f$ at the end of the head $F^2$, substantially as set forth.

4. The combination, in a bit-stock, of the head $F^2$, having a tubular projection, $f^3$, at one side, the arm A, fastened in the projection $f^3$, the tubular arbor $o$ around the projection within the head $F^2$, the shaft F', and bevel-gears F and $o'$ upon the shaft F' and arbor $o$, respectively, substantially as set forth.

5. The combination, in a bit-stock, of the tool-holder, the shaft F' of the same, the arm A, and crank N, the arbor $o$, and the shaft E around the arm A, the handle D around the crank N, and the bevel-gears F $o'$ on the shaft F' and arbor $o$, respectively, and a coupling to connect the shaft E with arbor $o$, and the gear $d$ $e'$ to connect the handle D and shaft E, substantially as set forth.

6. The combination, in a bit-stock, of the head $F^2$, projection $f^3$ at the side thereof, the arm A, extending from the projection $f^3$, the tubular shaft E around the arm A, the tubular arbor $o$, bevel-gears F and $o'$, connecting F' and $o$, the pawls P P', and ring R around the tubular arbor $o$ and shaft E, substantially as set forth.

7. The head $F^2$, having a tubular projection, $f^3$, at one side, the arm A, extending out therefrom, and cross-pin connecting the same, the tubular arbor $o$ around the projection, and its bevel-gear $o'$, held in place by said cross-pin, the gear F and shaft F' and tool-holder connected with the shaft F, the tubular shaft E around the arm A, the handle D, crank N, bevel-gears $d$ $e'$ upon the handle D and shaft E, respectively, and a coupling to connect shaft E and arbor $o$, substantially as set forth.

Signed by me this 24th day of February, A. D. 1885.

JOHANNES TH. PEDERSEN.

Witnesses:
 GEO. T. PINCKNEY,
 WILLIAM G. MOTT.